US011649979B2

(12) United States Patent
Inoue et al.

(10) Patent No.: US 11,649,979 B2
(45) Date of Patent: May 16, 2023

(54) AIR CONDITIONING SYSTEM, REMOTE CONTROLLER, AND METHOD FOR SAVING HISTORY OF OPERATION DATA ON AIR CONDITIONER

(71) Applicant: DAIKIN INDUSTRIES, LTD., Osaka (JP)

(72) Inventors: Ryouji Inoue, Osaka (JP); Toshio Ii, Osaka (JP); Yasuaki Kobayashi, Osaka (JP); Tatsuya Higuchi, Osaka (JP); Masahiro Kaneko, Osaka (JP); Ryousuke Yamamoto, Osaka (JP); Youta Katou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 57 days.

(21) Appl. No.: 16/767,062

(22) PCT Filed: Nov. 27, 2018

(86) PCT No.: PCT/JP2018/043595
§ 371 (c)(1),
(2) Date: May 26, 2020

(87) PCT Pub. No.: WO2019/116885
PCT Pub. Date: Jun. 20, 2019

(65) Prior Publication Data
US 2020/0370772 A1 Nov. 26, 2020

(30) Foreign Application Priority Data
Dec. 13, 2017 (JP) .............................. JP2017-238452

(51) Int. Cl.
*F24F 11/32* (2018.01)
*F24F 11/64* (2018.01)
(Continued)

(52) U.S. Cl.
CPC .............. *F24F 11/32* (2018.01); *F24F 11/52* (2018.01); *F24F 11/56* (2018.01); *F24F 11/61* (2018.01);
(Continued)

(58) Field of Classification Search
CPC .. F24F 11/32; F24F 11/64; F24F 11/65; F24F 11/56
See application file for complete search history.

(56) References Cited

U.S. PATENT DOCUMENTS

| | | | |
|---|---|---|---|
| 2007/0101186 A1* | 5/2007 | Chen | G06F 11/1456 714/E11.12 |
| 2010/0204958 A1 | 8/2010 | Kawai et al. | |

(Continued)

FOREIGN PATENT DOCUMENTS

| | | |
|---|---|---|
| EP | 2950010 A1 | 12/2015 |
| EP | 3220271 A1 | 9/2017 |

(Continued)

OTHER PUBLICATIONS

Extended European Search Report issued in corresponding European Application No. 18887505.8 dated Jan. 12, 2021 (7 pages).

(Continued)

*Primary Examiner* — Mohammad Ali
*Assistant Examiner* — Vincent W Chang
(74) *Attorney, Agent, or Firm* — Osha Bergman Watanabe & Burton LLP

(57) ABSTRACT

An air conditioning system includes: an outdoor unit of an air conditioner; an indoor unit of the air conditioner; and a remote controller that operates and monitors at least one of the outdoor unit or the indoor unit. The remote controller includes: a storage and a processor coupled to the storage. The processor of the remote controller: acquires operation data from at least one of the outdoor unit or the indoor unit;

(Continued)

stores the operation data in the storage by overwriting pre-stored operation data already in the storage when a predetermined capacity of the storage is exceeded; saves, during a past predetermined period when an abnormal condition occurs at the air conditioner and in the storage, a copy of the operation data; and displays the copy of the operation data or sends the copy of the operation data externally.

10 Claims, 4 Drawing Sheets

(51) Int. Cl.
    *F24F 11/65*         (2018.01)
    *F24F 11/56*         (2018.01)
    *F24F 11/52*         (2018.01)
    *F24F 11/61*         (2018.01)
    *G05B 19/042*      (2006.01)

(52) U.S. Cl.
    CPC .............. *F24F 11/64* (2018.01); *F24F 11/65* (2018.01); *G05B 19/042* (2013.01); *G05B 2219/2614* (2013.01)

(56) References Cited

U.S. PATENT DOCUMENTS

| | | | | |
|---|---|---|---|---|
| 2014/0330437 A1* | 11/2014 | Kuroiwa | ............ | H04L 43/0817 |
| | | | | 700/275 |
| 2015/0051739 A1* | 2/2015 | Song | ............ | G05B 15/02 |
| | | | | 700/276 |
| 2015/0081108 A1* | 3/2015 | Toriyama | ............ | F24F 11/62 |
| | | | | 700/276 |
| 2015/0345820 A1* | 12/2015 | Okamoto | ............ | F24F 11/30 |
| | | | | 702/182 |
| 2017/0010014 A1* | 1/2017 | Miyata | ............ | G05B 15/02 |
| 2017/0191689 A1* | 7/2017 | Fujihira | ............ | F24F 11/89 |
| 2017/0307246 A1* | 10/2017 | Ohara | ............ | F24F 11/58 |
| 2018/0058712 A1* | 3/2018 | Miyaura | ............ | F24F 11/30 |
| 2018/0266719 A1* | 9/2018 | Kim | ............ | F24F 11/32 |

FOREIGN PATENT DOCUMENTS

| | | |
|---|---|---|
| JP | H07-103540 A | 4/1995 |
| JP | 2008144973 A | 6/2008 |
| JP | 2008249310 A | 10/2008 |
| JP | 2009079843 A | 4/2009 |
| JP | 2013174385 A | 9/2013 |
| JP | 2013245835 A | 12/2013 |
| JP | 2016114341 A | 6/2016 |

OTHER PUBLICATIONS

International Preliminary Report on Patentability issued in corresponding International Application No. PCT/JP2018/043595, dated Jun. 16, 2020 (7 pages).

English translation of International Search Report issued in corresponding International Application No. PCT/JP2018/043595, dated Feb. 12, 2019 (1 page).

* cited by examiner

AIR CONDITIONING SYSTEM, REMOTE CONTROLLER, AND METHOD FOR SAVING HISTORY OF OPERATION DATA ON AIR CONDITIONER

TECHNICAL FIELD

The present invention relates to an air conditioning system, a remote controller for use in the air conditioning system, and a method for saving a history of operation data in an air conditioner.

BACKGROUND

There has already been known a technique of displaying, on a remote controller, abnormal conditions detected at an outdoor unit and an indoor unit of an air conditioner during operation. It has also been considered that a remote controller monitors operation data in an outdoor unit and operation data in an indoor unit to acquire states of the outdoor unit and the indoor unit at points in transition time from normal conditions to abnormal conditions (refer to, for example, Patent Literature 1).

PATENT LITERATURE

Patent Literature 1: Japanese Unexamined Patent Publication No. 2013-174385

In an air conditioner known in the art, a remote controller monitors operation data as an instantaneous value at the moment when an abnormal condition occurs. Consequently, even when a service engineer comes and finds that the air conditioner stops due to occurrence of an abnormal condition, the remote controller merely displays, for example, an error code indicating a cause of the abnormal condition. If the service engineer restarts the air conditioner to reproduce the abnormal condition while seeing the operation data, the service engineer can identify the cause of the abnormal condition. However, in a case of, for example, an abnormal condition with low reproducibility, it is difficult to find a cause of the abnormal condition within a limited time.

SUMMARY

One or more embodiments of the present invention readily find causes of abnormal conditions occurring at an air conditioning system during operation, such as an abnormal condition of which the cause is difficult to find from only a current state and an abnormal condition with low reproducibility.

(1) According to one or more embodiments, an air conditioning system includes an outdoor unit of an air conditioner, an indoor unit of the air conditioner, and a remote controller configured to operate and monitor at least one of the outdoor unit or the indoor unit. The remote controller includes a storage unit (storage), a monitoring unit, and a data output unit. The monitoring unit is configured to acquire operation data (i.e., first operation data) from at least one of the outdoor unit or the indoor unit and to store the acquired operation data in the storage unit. The monitoring unit is also configured to store operation data in the storage unit by overwriting the operation data stored in the storage unit (i.e., pre-stored operation data already in the storage) when the storage unit stores the operation data in excess of a predetermined capacity. The monitoring unit is also configured to save the operation data stored in the storage unit during a past predetermined period when an abnormal condition occurs at the air conditioner during operation. The data output unit is configured to display the saved operation data or to send the saved operation data externally.

The air conditioning system having the configuration described above allows an operator to readily find causes of abnormal conditions such as an abnormal condition of which the cause is difficult to find from only a current state and an abnormal condition with low reproducibility.

(2) In the air conditioning system as recited in (1), the storage unit may include: a first memory configured to store the operation data; and a second memory configured to save a copy of the operation data stored in the first memory.

This configuration enables use of different memories, that is, a memory in which operation data is saved and a memory in which stored operation data is updated.

(3) In the air conditioning system as recited in (1) or (2), the monitoring unit may change a measure as to (i.e., the monitoring unit determines) whether to save the operation data, in accordance with a level of the abnormal condition occurring at the air conditioner during operation.

This configuration enables an appropriate change in measure as to whether to save operation data, in accordance with a level of an abnormal condition.

(4) In the air conditioning system as recited in any of (1) to (3), the monitoring unit may continuously acquire the operation data until a lapse of a certain time (i.e., a predetermined time) from the occurrence of the abnormal condition, and may save the operation data stored in the storage unit during a predetermined period until the lapse of the certain time.

In a case where there is a time difference between a timing of receiving operation data from the outdoor unit and a timing of receiving operation data from the indoor unit, this configuration enables saving of, for example, operation data received immediately after occurrence of an abnormal condition.

(5) The air conditioning system as recited in any of (1) to (4) may further include a mobile information terminal having application software installed therein, the mobile information terminal being configured to display the operation data that is saved in the storage unit and sent from the data output unit by near-field radio communication.

This configuration enables acquisition of necessary operation data with ease in such a manner that the operator brings the mobile information terminal such as a smartphone close to the remote controller.

(6) According to one or more embodiments, a remote controller is configured to operate and monitor at least one of an outdoor unit or an indoor unit of an air conditioner. The remote controller includes a storage unit, a monitoring unit, and a data output unit. The monitoring unit is configured to acquire operation data from at least one of the outdoor unit or the indoor unit and to store the acquired operation data in the storage unit. The monitoring unit is also configured to store operation data in the storage unit by overwriting the operation data stored in the storage unit when the storage unit stores the operation data in excess of a predetermined capacity. The monitoring unit is also configured to save the operation data stored in the storage unit during a past predetermined period when an abnormal condition occurs at the air conditioner during operation. The data output unit is configured to display the saved operation data or to send the saved operation data externally.

The remote controller having the configuration described above allows the operator to readily find causes of abnormal conditions such as an abnormal condition of which the cause is difficult to find from only a current state and an abnormal condition with low reproducibility.

(7) A method for saving a history of operation data (i.e., operation data history) in an air conditioner according to one or more embodiments is performed by a remote controller configured to operate and monitor at least one of an outdoor unit or an indoor unit of the air conditioner. The method includes acquiring and storing operation data from at least one of the outdoor unit or the indoor unit, and storing operation data by overwriting the stored operation data when the stored operation data exceeds a predetermined capacity. The method also includes saving the operation data stored during a past predetermined period when an abnormal condition occurs at the air conditioner during operation. The method also includes displaying the saved operation data or sending the saved operation data externally, in accordance with a request from an operator.

The method described above allows the operator to readily find causes of abnormal conditions such as an abnormal condition of which the cause is difficult to find from only a current state and an abnormal condition with low reproducibility.

DETAILED DESCRIPTION

<<Exemplary Air Conditioning System>>

Figure 1:
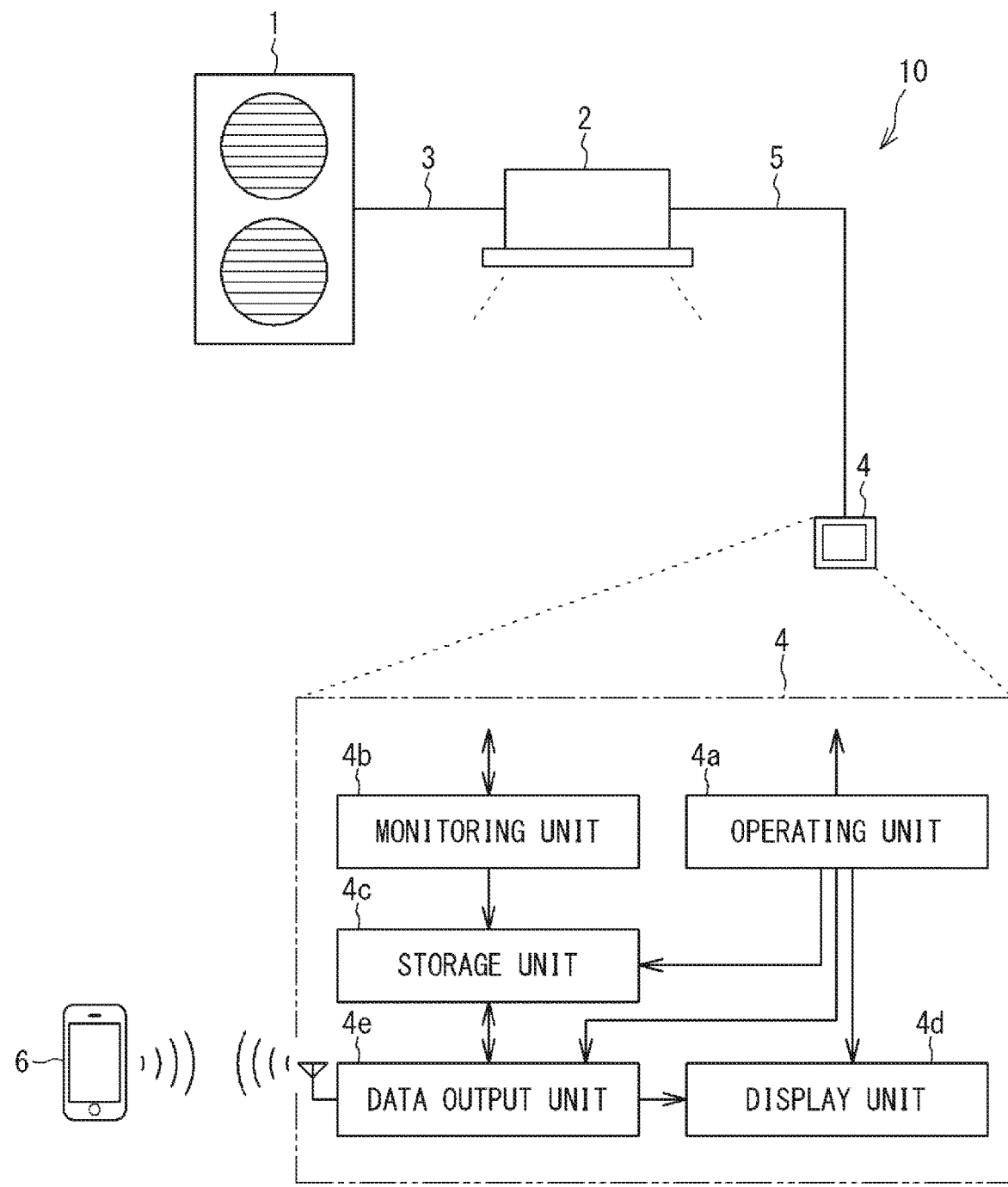
FIG. 1 illustrates one or more embodiments of signal wire connections in an air conditioning system.

FIG. 1 illustrates one or more embodiments of signal wire connections in an air conditioning system 10. As illustrated in FIG. 1, an outdoor unit 1 is connected to an indoor unit 2 via a signal wire 3. The outdoor unit 1 is also connected to the indoor unit 2 via a refrigerant pipe which is not illustrated in FIG. 1. The indoor unit 2 is connected to a remote controller 4 via a signal wire 5. The remote controller 4 is disposed indoors.

The remote controller 4 is capable of performing various operations on the indoor unit 2 and the outdoor unit 1. For example, the remote controller 4 starts or stops the indoor unit 2 and the outdoor unit 1. In addition, the remote controller 4 sets a room temperature and an operating mode. The remote controller 4 has a monitoring function of acquiring operation data from each of the outdoor unit 1 and the indoor unit 2, saving the acquired operation data, and displaying the saved operation data if necessary.

As illustrated in FIG. 1, for example, the remote controller 4 includes functional units, that is, an operating unit 4a, a monitoring unit 4b, a storage unit 4c, a display unit 4d, and a data output unit 4e. Specifically, these functional units may be implemented with a computer including, for example, a central processing unit (i.e., a computer processor or processor) and a memory (e.g., a read only memory, a random access memory) for storing and executing a program, and peripheral devices to be added if necessary.

The operating unit 4a is a functional unit through which an operator performs a typical operation regarding air conditioning in such a manner that, for example, the operator touches a surface of the remote controller 4 or pushes a button on the remote controller 4. The display unit 4d displays the details of the operation. The display unit 4d includes, for example, a liquid crystal display, an organic electroluminescent display, or the like.

The monitoring unit 4b is capable of establishing communications with the outdoor unit 1 and the indoor unit 2. The monitoring unit 4b acquires operation data, stores the acquired operation data in the storage unit 4c in succession, and further stores operation data in the storage unit 4c by overwriting the operation data stored in the storage unit 4c when the storage unit 4c stores the operation data in excess of a predetermined capacity. The monitoring unit 4b repeatedly performs these operations. If an abnormal condition occurs during operation, the monitoring unit 4b saves the operation data stored in the storage unit 4c during a past predetermined period so as to restrain the operation data from overwriting. The storage unit 4c includes a semiconductor memory. For example, the storage unit 4c is disposed for storing operation data, independently of a main memory in a computer.

The data output unit 4e is capable of displaying on the display unit 4d the operation data saved in the storage unit 4c, in accordance with a predetermined operation by the operating unit 4a. For example, the data output unit 4e has a function of near-field radio communication (an NFC function). The data output unit 4e is capable of sending by near-field radio communication the operation data saved in the storage unit 4c to an external device in accordance with a predetermined operation by the operating unit 4a.

This external device is, for example, a mobile information terminal 6, such as a smartphone, having an NFC function. In the mobile information terminal 6, an application (application software) is installed for establishing communication with the data output unit 4e. The mobile information terminal 6 may also be regarded as a constituent element of the air conditioning system 10.

<<Method for Saving History of Operation Data on Air Conditioner, as Exemplary Monitoring Operation>>

Next, a description will be given of a monitoring operation of the remote controller 4, the monitoring operation involving saving a history of operation data in an air conditioner.

Figure 2:
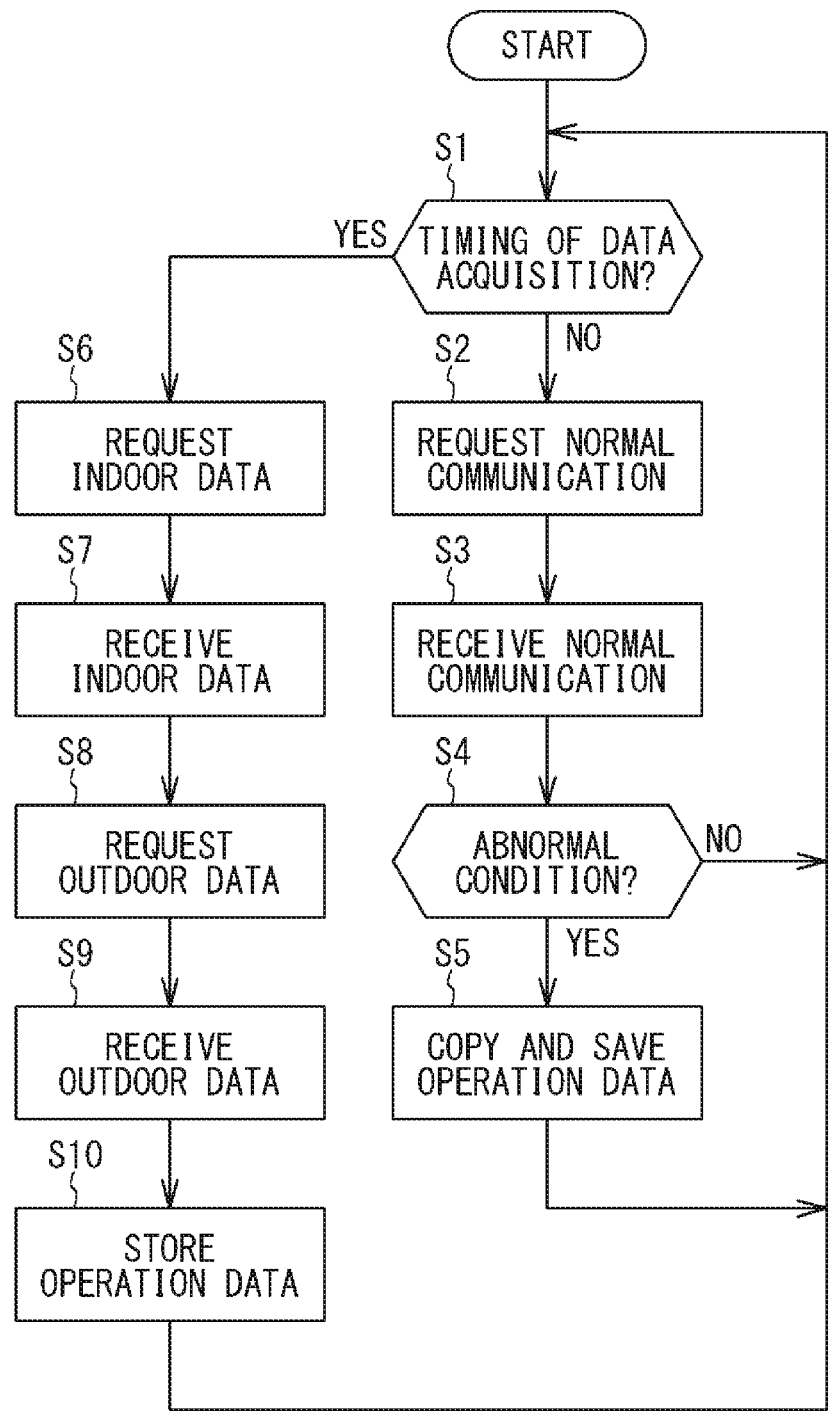
FIG. 2 is a flowchart of an exemplary monitoring operation by a remote controller, more specifically, a monitoring unit in accordance with one or more embodiments.

FIG. 2 is a flowchart of an exemplary monitoring operation by the remote controller 4, more specifically, the monitoring unit 4b. As illustrated in FIG. 2, when an air conditioning operation starts, the monitoring unit 4b determines whether it is a timing of data acquisition now (step S1). For example, this timing comes every 30 seconds from the start. When it is not this timing now, the monitoring unit 4b makes a request of normal communication to each of the outdoor unit 1 and the indoor unit 2 (step S2). Next, the monitoring unit 4b receives information about normal communication from each of the outdoor unit 1 and the indoor unit 2 (step S3). When no abnormal condition occurs ("No" in step S4), the monitoring unit 4b repeatedly executes processing from steps S1, S2, S3 and S4 until the timing of data acquisition comes.

When the monitoring unit 4b determines in step S1 that it is the timing of data acquisition now, the monitoring unit 4b makes a request of indoor data (operation data stored in the indoor unit 2) to the indoor unit 2 (step S6), and then receives the indoor data (step S7). Next, the monitoring unit 4b makes a request of outdoor data (operation data stored in the outdoor unit 1) to the outdoor unit 1 (step S8), and then receives the outdoor data (step S9). The monitoring unit 4b stores each of the indoor data and the outdoor data as operation data in the storage unit 4c (step S10).

Thereafter, the monitoring unit 4b repeatedly executes the processing of steps S1, S2, S3 and S4 and the processing of steps S6, S7, S8, S9 and S10 unless an abnormal condition occurs. The processing from step S6 to step S10 is executed every 30 seconds during the processing from step S1 to step S4. After the monitoring unit 4b repeatedly stores operation data in the storage unit 4c in step S10 so that a total amount of a history of operation data reaches a predetermined capacity of the storage unit 4c, the monitoring unit 4b continuously stores operation data in an endless manner by overwriting the operation data on the oldest operation data. Therefore, the storage unit 4c always holds latest operation data stored therein during a predetermined time.

When the monitoring unit 4b detects an abnormal condition in step S4, the monitoring unit 4b makes a copy of the operation data currently stored in the storage unit 4c in its entirety, and saves the copy of the operation data in another place. Thereafter, operation data is continuously stored in the storage unit 4c in an endless manner, and the operation data stored in the storage unit 4c is continuously overwritten. However, the saved operation data remains as it is until, for example, a service engineer erases the operation data.

When a user of the air conditioning system has informed a service engineer of an abnormal condition occurred at the air conditioning system, the service engineer arrives at a site where the air conditioning system is installed. The service engineer sees the saved operation data by downloading the operation data onto the mobile information terminal 6 or displaying the operation data on the display unit 4d to find a cause of the abnormal condition. The service engineer thus readily finds causes of abnormal conditions such as:

an abnormal condition of which the cause is difficult to find from only an abnormal code or a current status; and an abnormal condition that is reproduced with less certainty even when the service engineer restarts the air conditioning system.

When the service engineer finds the cause of the abnormal condition, the service engineer makes repairs on the air conditioning system 10, and then restarts the air conditioner system 10. When the service engineer determines from the result of restart that the air conditioning system 10 normally operates, the service engineer completes the repairs. The service engineer will erase the operation data saved in the storage unit 4c by, for example, operating the operating unit 4a.

<<Specific Example of how to Save Operation Data>>

Figure 3:
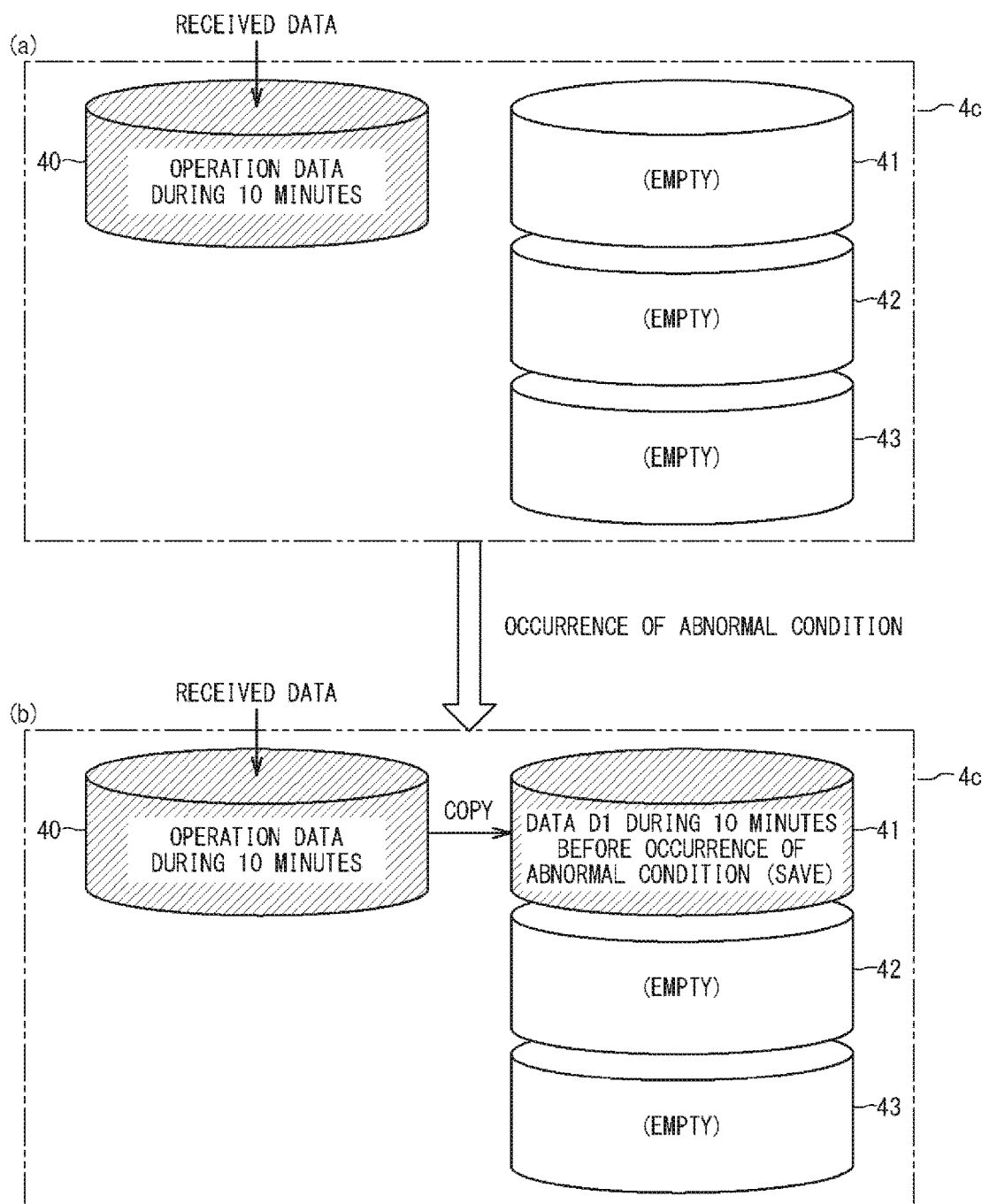
FIG. 3 illustrates how operation data is saved in a memory in accordance with one or more embodiments.

FIG. 3 illustrates how to save operation data in a memory. As illustrated in (a) of FIG. 3, normally, the monitoring unit 4b stores received operation data in a memory 40 of the storage unit 4c. In a case of storing operation data items during, for example, past 10 minutes, that is, in a case of storing one operation data item per 30 seconds, the memory 40 is capable of storing 20 operation data items. The storage unit 4c includes three memories 41, 42, and 43 in addition to the memory 40. The memories 41, 42, and 43 may be three memory areas in one physical memory or may be physically individual three memories.

While the air conditioning system 10 normally operates without occurrence of an abnormal condition, the monitoring unit 4b continuously stores operation data in the memory 40, so that the operation data in the memory 40 is always updated to the operation data stored during recent past 10 minutes. Each of the memories 41, 42, and 43 stores no operation data, and is in a state of "empty".

As illustrated in (b) of FIG. 3, when an abnormal condition occurs, the monitoring unit 4b makes a copy of the operation data stored in the memory 40 during recent past 10 minutes, and saves the copy of the operation data in the memory 41 (the processing from step S4 to step S5 in FIG. 2). The operation data saved in the memory 41 is neither erased nor overwritten automatically, and is saved unless it is erased or overwritten intentionally. The service engineer sees the operation data saved in the memory 41, thereby readily finding a cause of the abnormal condition.

In practice, if the service engineer restarts the air conditioning system 10 with his assumption of having eliminated the cause of the abnormal condition, an abnormal condition indicated by the same abnormal code occurs again in some cases. Even in such a case, the memory 40 always holds operation data stored therein during recent past 10 minutes. Upon occurrence of an abnormal condition, a copy of the operation data is saved in the memory 41. Therefore, even when the same abnormal condition occurs successively, the service engineer sees operation data stored during recent past 10 minutes, thereby finding a cause of the abnormal condition each time the abnormal condition occurs.

<<Case where Abnormal Conditions Occur Successively>>

Figure 4:
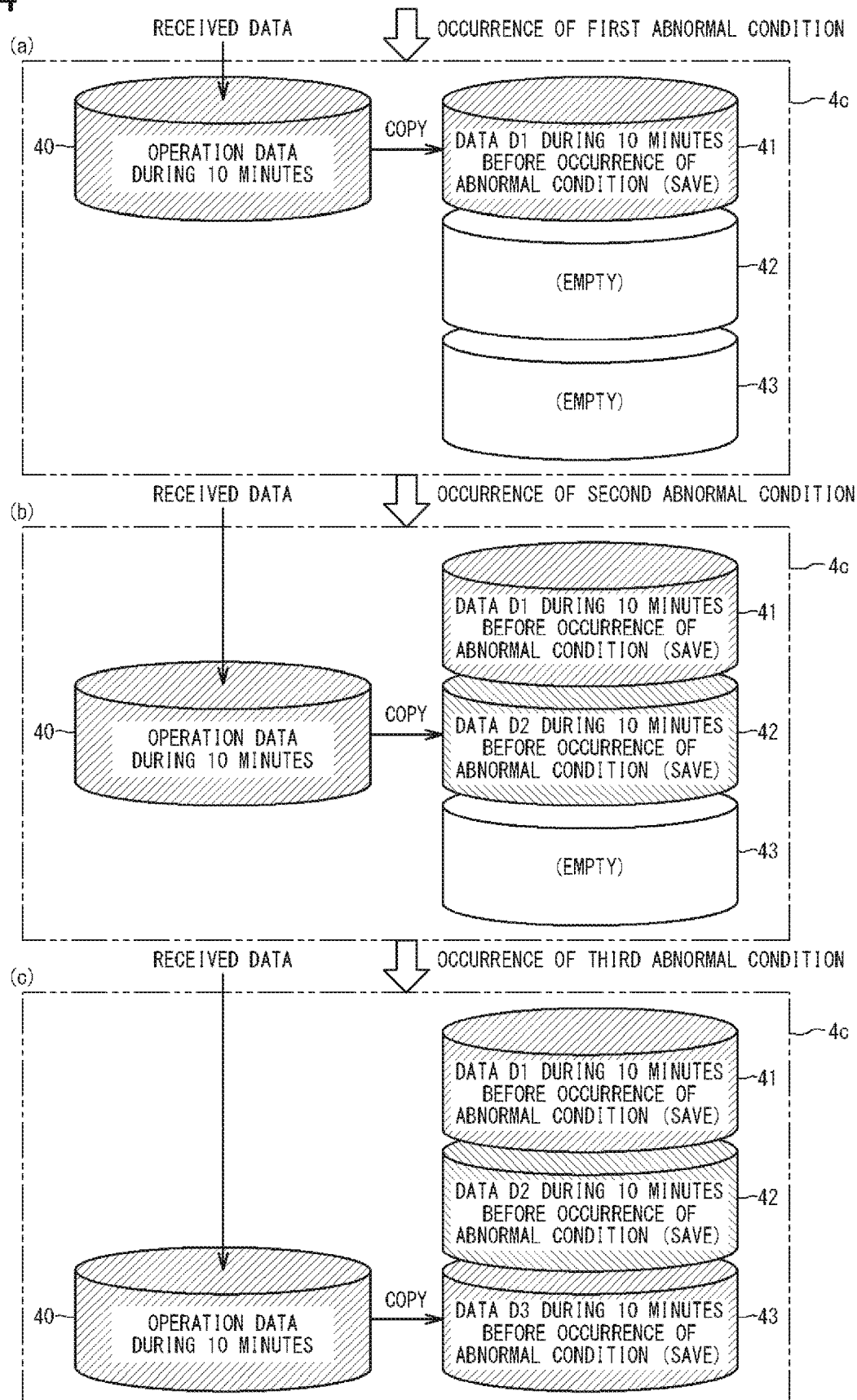
FIG. 4 illustrates how operation data is saved in accordance to one or more embodiments where different abnormal conditions occur successively.

FIG. 4 illustrates how to save operation data in a case where different abnormal conditions occur successively. For example, it is assumed that an abnormal condition of "abnormal high pressure" occurs first at the outdoor unit 1. A compressor sucks and compresses low-temperature and low-pressure gas refrigerant to generate high-temperature and high-pressure gas refrigerant. At this time, if the temperature and pressure of the gas refrigerant to be sucked into the compressor are not satisfactorily reduced, pressure at the compressor becomes too high. In order to protect the compressor, the remote controller 4 determines that the abnormal condition of "abnormal high pressure" occurs, and stops the compressor. As illustrated in (a) of FIG. 4, in this case, the monitoring unit 4b makes a copy of the operation data stored in the memory 40 during 10 minutes before occurrence of the failure, and then saves the copy of the operation data (data D1) in the memory 41.

It is also assumed that an abnormal condition of "abnormal drain pump" then occurs at the indoor unit 2. During a cooling operation, the indoor unit 2 retains water to be drained. In an indoor unit of a type incapable of natural drainage, a pump is used for forcibly draining water. If the pump has failed, a drainage level rises, and water to be drained brims over the indoor unit if being left as it is. In order to prevent this situation, when a float switch detects a rise in drainage level, the remote controller 4 determines that the abnormal condition of "abnormal drain pump" occurs, and stops the indoor unit 2. As illustrated in (b) of FIG. 4, in this case, the monitoring unit 4b makes a copy of the operation data stored in the memory 40 during 10 minutes before occurrence of the failure, and then saves the copy of the operation data (data D2) in the memory 42.

It is also assumed that an abnormal condition of "abnormal gas shortage" then occurs at the outdoor unit 1. Refrigerant shortage results in not only unsatisfactory air conditioning capacity, but also a possibility of a leak of refrigerant from somewhere. In such a case, the remote controller 4 stops the outdoor unit 1, and notifies the user of the abnormal condition of "abnormal gas shortage". As illustrated in (c) of FIG. 4, in this case, the monitoring unit 4b makes a copy of the operation data stored in the memory 40 during 10 minutes before occurrence of the failure, and then saves the copy of the operation data (data D3) in the memory 43.

As described above, the service engineer is able to readily find causes of different abnormal conditions that occur successively, in such a manner that multiple histories of operation data are saved in accordance with different abnormal codes.

For example, the air conditioning system 10 according to the foregoing embodiments may be summarized and represented as follows. However, the following representations are merely illustrative and not restrictive.

The air conditioning system 10 includes the outdoor unit 1 of the air conditioner, the indoor unit 2 of the air conditioner, and the remote controller 4 configured to operate and monitor at least one of the outdoor unit 1 or the indoor unit 2. The remote controller 4 in the air conditioning system 10 includes the storage unit 4c, the monitoring unit 4b, and the data output unit 4e. The monitoring unit 4b is configured to acquire operation data from at least one of the outdoor unit 1 or the indoor unit 2 and to store the acquired operation data in the storage unit 4c. The monitoring unit 4b is also configured to store operation data by overwriting the operation data stored in the storage unit 4c when the storage unit 4c stores the operation data in excess of the predetermined capacity. The monitoring unit 4b is also configured to save the operation data stored in the storage unit 4c during a past predetermined period when an abnormal condition occurs at the air conditioner during operation. The data output unit 4e is configured to display the saved operation data or to send the saved operation data externally.

According to the air conditioning system 10 having the configuration described above, in a state in which the air conditioner operates normally, the monitoring unit stores operation data in the storage unit. When the storage unit stores operation data in excess of the predetermined capacity, the monitoring unit stores operation data in the storage unit in an endless manner by overwriting the operation data stored in the storage unit. If an abnormal condition occurs, the monitoring unit saves the operation data stored in the storage unit during the past predetermined period so as not to overwrite the operation data. Accordingly, the storage unit keeps a history of the operation data stored therein until the occurrence of the abnormal condition. The operator such as the service engineer is thus able to see the history of the operation data stored until the occurrence of the abnormal condition, by displaying the saved operation data in the remote controller 4 or downloading the saved operation data onto, for example, the mobile information terminal 6. This configuration thus allows the operator to readily find causes of abnormal conditions such as an abnormal condition of which the cause is difficult to find from only a current state and an abnormal condition with low reproducibility.

The storage unit 4c includes, for example, the first memory 40 configured to store the operation data, and the second memories 41, 42, and 43 each configured to save a copy of the operation data stored in the first memory 40.

In this case, if an abnormal condition occurs, the monitoring unit 4b copies the operation data stored in the first memory 40 during a recent predetermined time, and saves a copy of the operation data in one of the second memories 41, 42, and 43. On the other hand, the monitoring unit 4b continuously stores operation data in the first memory 40. This configuration thus enables use of different memories, that is, a memory in which operation data is saved and a memory in which stored operation data is updated.

The monitoring unit 4b may change a measure as to whether to save the operation data, in accordance with a level of the abnormal condition occurring at the air conditioner during operation.

In a case of, for example, an abnormal condition to a degree that the air conditioner during operation stops irrespective of the operation of the remote controller 4, the monitoring unit 4b saves a history of operation data in the storage unit 4c. As to an abnormal condition to a degree that the air conditioner does not need to stop, that is, a slight abnormal condition in a "caution" level, such an abnormal condition is naturally solved in some cases; therefore, the monitoring unit 4b does not save the history of the operation data. As described above, this configuration enables an appropriate change in measure as to whether to save operation data, in accordance with a level of an abnormal condition.

In the foregoing embodiments, the monitoring unit 4b saves operation data immediately after occurrence of an abnormal condition. Alternatively, the monitoring unit 4b may continuously acquire operation data until a lapse of a certain time from the occurrence of the abnormal condition, and may save the operation data stored in the storage unit 4c during a predetermined period until the lapse of the certain time. This means that a waiting time is set as the certain time before the monitoring unit 4b copies operation data and then saves a copy of the operation data in the storage unit 4c in step S5 illustrated in FIG. 2, for example.

In a case where there is a time difference between a timing of receiving operation data from the outdoor unit and a timing of receiving operation data from the indoor unit, this configuration enables saving of, for example, operation data received immediately after occurrence of an abnormal condition. This configuration thus enables more reliable saving of operation data that may be helpful for finding a cause of an abnormal condition.

The air conditioning system 10 may include the mobile information terminal 6. The mobile information terminal 6 has the application software installed therein to display the operation data that is saved in the storage unit 4c and sent from the data output unit 4e by near-field radio communication.

This configuration enables acquisition of necessary operation data with ease in such a manner that the operator brings the mobile information terminal such as a smartphone close to the remote controller. This configuration also enables visually recognizable display of an amount of operation data as, for example, a change with time.

A remote controller as an exemplary representation based on one or more embodiments of the present invention includes the storage unit 4c, the monitoring unit 4b, and the data output unit 4e. The monitoring unit 4b is configured to acquire operation data from at least one of the outdoor unit 1 or the indoor unit 2 and to store the acquired operation data in the storage unit 4c. The monitoring unit 4b is also configured to store operation data by overwriting the operation data stored in the storage unit 4c when the storage unit 4c stores the operation data in excess of the predetermined capacity. The monitoring unit 4b is also configured to save the operation data stored in the storage unit 4c during a past predetermined period when an abnormal condition occurs at the air conditioner during operation. The data output unit 4e is configured to display the saved operation data or to send the saved operation data externally.

According to the remote controller 4 having the configuration described above, in a state in which the air conditioner operates normally, the monitoring unit stores operation data in the storage unit. When the storage unit stores operation data in excess of the predetermined capacity, the monitoring unit stores operation data in the storage unit in an endless manner by overwriting the operation data stored in the storage unit. If an abnormal condition occurs, the monitoring unit saves the operation data stored in the storage unit during the past predetermined period so as not to overwrite the operation data. Accordingly, the storage unit keeps a history of the operation data stored therein until the occurrence of the abnormal condition. The operator such as the service engineer is thus able to see the history of the operation data stored until the occurrence of the abnormal condition, by displaying the saved operation data in the remote controller 4 or downloading the saved operation data onto, for example, the mobile information terminal 6. This configuration thus allows the operator to readily find causes of abnormal conditions such as an abnormal condition of which the cause is difficult to find from only a current state and an abnormal condition with low reproducibility.

From the viewpoint of a method, a method for saving a history of operation data in an air conditioner, as an exemplary representation based on one or more embodiments of the present invention, is a method for saving a history of operation data in an air conditioner, the method being performed by the remote controller 4 configured to operate and monitor at least one of the outdoor unit 1 or the indoor unit 2 of the air conditioner. The method includes (i) acquiring and storing operation data from at least one of the outdoor unit 1 or the indoor unit 2, and storing operation data by overwriting the stored operation data when the stored operation data exceeds the predetermined capacity. The method also includes (ii) saving the operation data stored during a past predetermined period when an abnormal condition occurs at the air conditioner during operation. The method also includes (iii) displaying the saved operation data or sending the saved operation data externally, in accordance with a request from an operator.

According to the method described above, in a state in which the air conditioner operates normally, operation data is stored in the remote controller. When the operation data stored in the remote controller exceeds the predetermined capacity, operation data is stored in an endless manner such that the operation data stored in the remote controller is overwritten. If an abnormal condition occurs during operation, the operation data stored within the past predetermined period is saved such that the operation data is not overwritten. Accordingly, the storage unit keeps a history of the operation data stored therein until the occurrence of the abnormal condition. The operator such as the service engineer is thus able to see the history of the operation data stored until the occurrence of the abnormal condition, by displaying the saved operation data in the remote controller 4 or downloading the saved operation data onto, for example, the mobile information terminal 6. This configuration thus allows the operator to readily find causes of abnormal conditions such as an abnormal condition of which the cause is difficult to find from only a current state and an abnormal condition with low reproducibility.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: OUTDOOR UNIT
2: INDOOR UNIT
3: SIGNAL WIRE
4: REMOTE CONTROLLER
4a: OPERATING UNIT
4b: MONITORING UNIT
4c: STORAGE UNIT
4d: DISPLAY UNIT
4e: DATA OUTPUT UNIT
5: SIGNAL WIRE
6: MOBILE INFORMATION TERMINAL
10: AIR CONDITIONING SYSTEM
40: MEMORY
41: MEMORY
42: MEMORY
43: MEMORY

The invention claimed is:

1. An air conditioning system comprising:
an outdoor unit of an air conditioner;
an indoor unit of the air conditioner; and
a remote controller that operates and monitors at least one of the outdoor unit or the indoor unit, wherein
the remote controller comprises:
a storage including a first memory and second memories; and
a processor coupled to the storage and that:
determines, at a prescribed interval, whether a timing has arrived to acquire operation data from at least one of the outdoor unit or the indoor unit;
acquires the operation data based on a determination that the timing has arrived;
saves the operation data in the first memory by overwriting pre-stored operation data already stored in the first memory when a predetermined capacity of the first memory is exceeded;
detects an abnormal condition of the air conditioner;
in response to detection of a first abnormal condition, saves, in a predetermined memory of the second memories, a first copy of the operation data stored during a first past period of a predetermined length;
in response to detection of reoccurrence of the first abnormal condition, saves, in the predetermined memory, a second copy of the operation data stored during a second past period of the predetermined length;
in response to detection of a second abnormal condition different from the first abnormal condition, saves, in a memory of the second memories different from the predetermined memory of the second memories, the second copy of the operation data stored during the second past period; and
displays one or both of the first and second copies of the operation data or sends one or both of the first and second copies of the operation data externally.

2. The air conditioning system according to claim 1, wherein the processor further:
determines whether to save one or both of the first and second copies of the operation data based on a level of the abnormal condition.

3. The air conditioning system according to claim 2, wherein the processor further:
continuously acquires the operation data until a lapse of a predetermined time from the detection of the abnormal condition, and
continuously saves copies of the operation data during a predetermined period until the lapse of the predetermined time.

4. The air conditioning system according to claim 2, further comprising:

a mobile information terminal having application software installed therein, wherein
the mobile information terminal displays one or both of the first and second copies of the operation data saved in the storage that is sent from the processor by near-field radio communication.

5. The air conditioning system according to claim 3, further comprising:
a mobile information terminal having application software installed therein, wherein
the mobile information terminal displays one or both of the first and second copies of the operation data saved in the storage that is sent from the processor by near-field radio communication.

6. The air conditioning system according to claim 1, wherein the processor further:
continuously acquires the operation data until a lapse of a predetermined time from the detection of the abnormal condition, and
continuously saves copies of the operation data during a predetermined period until the lapse of the predetermined time.

7. The air conditioning system according to claim 6, further comprising:
a mobile information terminal having application software installed therein, wherein
the mobile information terminal displays one or both of the first and second copies of the operation data saved in the storage that is sent from the processor by near-field radio communication.

8. The air conditioning system according to claim 1, further comprising:
a mobile information terminal having application software installed therein, wherein
the mobile information terminal displays one or both of the first and second copies of the operation data saved in the storage that is sent from the processor by near-field radio communication.

9. A remote controller that operates and monitors at least one of an outdoor unit or an indoor unit of an air conditioner, the remote controller comprising:
a storage including a first memory and second memories; and
a processor coupled to the storage and that:
determines, at a prescribed interval, whether a timing has arrived to acquire operation data from at least one of the outdoor unit or the indoor unit;
acquires the operation data based on a determination that the timing has arrived;
saves the operation data in the first memory by overwriting pre-stored operation data already in the first memory when a predetermined capacity of the first memory is exceeded;
detects an abnormal condition of the air conditioner;
in response to detection of a first abnormal condition, saves, in a predetermined memory of the second memories, a first copy of the operation data stored during a first past period of a predetermined length;
in response to detection of reoccurrence of the first abnormal condition, saves, in the predetermined memory, a second copy of the operation data stored during a second past period of the predetermined length;
in response to detection of a second abnormal condition different from the first abnormal condition, saves, in a memory of the second memories different from the predetermined memory of the second memories, the second copy of the operation data stored during the second past period; and
displays one or both of the first and second copies of the operation data or sends one or both of the first and second copies of the operation data externally.

10. A method for saving operation data history in an air conditioner by a remote controller that operates and monitors at least one of an outdoor unit or an indoor unit of the air conditioner, the method comprising:
determining, at a prescribed interval, whether a timing has arrived to acquire operation data from at least one of the outdoor unit or the indoor unit;
acquiring the operation data based on a determination that the timing has arrived;
saving the operation data by overwriting pre-stored operation data already in a first memory of a storage when a predetermined capacity of the first memory is exceeded;
detecting an abnormal condition of the air conditioner;
in response to detection of a first abnormal condition, saving, in a predetermined memory of second memories of the storage, a first copy of the operation data stored during a first past period of a predetermined length;
in response to detection of reoccurrence of the first abnormal condition, saving, in the predetermined memory, a second copy of the operation data stored during a second past period of the predetermined length;
in response to detection of a second abnormal condition different from the first abnormal condition, saving, in a memory of the second memories different from the predetermined memory of the second memories, the second copy of the operation data stored during the second past period; and
based on a request from an operator, displaying one or both of the first and second copies of the operation data or sending one or both of the first and second copies of the operation data externally.

* * * * *